(12) United States Patent
Li

(10) Patent No.: US 10,080,334 B2
(45) Date of Patent: Sep. 25, 2018

(54) ECOLOGICAL HYDROPONICS CONTROL SYSTEM

(71) Applicant: Lrider Technology Co., Ltd., Shenzhen (CN)

(72) Inventor: Yongsheng Li, Nanjing (CN)

(73) Assignee: Lrider Technology Co., Ltd., Shenzhen (CN)

( * ) Notice: Subject to any disclaimer, the term of this patent is extended or adjusted under 35 U.S.C. 154(b) by 241 days.

(21) Appl. No.: 15/244,987

(22) Filed: Aug. 23, 2016

(65) Prior Publication Data
US 2018/0054985 A1  Mar. 1, 2018

(51) Int. Cl.
| | |
|---|---|
| *A01G 31/00* | (2018.01) |
| *A01G 31/02* | (2006.01) |
| *A01G 9/24* | (2006.01) |
| *A01G 7/04* | (2006.01) |
| *A01G 7/02* | (2006.01) |
| *A01G 9/20* | (2006.01) |
| *A01G 9/18* | (2006.01) |
| *F21V 21/22* | (2006.01) |
| *F21Y 115/10* | (2016.01) |

(52) U.S. Cl.
CPC ............... *A01G 31/02* (2013.01); *A01G 7/02* (2013.01); *A01G 7/045* (2013.01); *A01G 9/18* (2013.01); *A01G 9/20* (2013.01); *A01G 9/246* (2013.01); *A01G 9/247* (2013.01); *F21V 21/22* (2013.01); *F21Y 2115/10* (2016.08)

(58) Field of Classification Search
CPC . A01K 7/02; A01K 7/04; A01K 7/045; A01K 9/14; A01K 9/18; A01K 9/20; A01K 9/24; A01K 9/246; A01K 9/247; A01K 9/26; A01K 31/02
See application file for complete search history.

(56) References Cited

U.S. PATENT DOCUMENTS

| | | | | |
|---|---|---|---|---|
| 4,196,544 A | * | 4/1980 | Davis ..................... | A01G 7/045 47/17 |
| 4,742,475 A | * | 5/1988 | Kaiser ..................... | A01G 9/26 700/278 |

(Continued)

*Primary Examiner* — Trinh T Nguyen
(74) *Attorney, Agent, or Firm* — Inskeep IP Group, Inc.

(57) ABSTRACT

An ecological hydroponics control system includes an ecological hydroponics house, wherein: the ecological hydroponics house is provided with ecological control system, smart host system, sensing system and planting system, the smart host system is connected to the ecological control system, the sensing system and the planting system, the ecological control system includes: water supplying and draining system, lighting system, air conditioning system, ventilating system, humidifying system and gas supplying system. The present invention has characteristics of high productivity and high stability, also has ability of controlling various ecological environments including main environments of plant growing, providing ecological environment suitable for the plant growing best, the cultivation period can be shortened to ½-⅔ of the conventional cultivation period, it also has water saving function, where the water volume required will be about ¹⁄₅₀ of that required in the normal open-type plant culture, which obtaining the maximized productivity and resource utilization.

5 Claims, 3 Drawing Sheets

(56) References Cited

U.S. PATENT DOCUMENTS

| | | | | |
|---|---|---|---|---|
| 4,937,969 A | * | 7/1990 | Kawabe | A01G 31/02 135/94 |
| 5,001,859 A | * | 3/1991 | Sprung | A01G 9/1438 47/17 |
| 2003/0101645 A1 | * | 6/2003 | Cole | A01G 31/02 47/61 |
| 2014/0283452 A1 | * | 9/2014 | Dittman | A01G 31/06 47/62 R |
| 2014/0318012 A1 | * | 10/2014 | Fujiyama | F24F 11/0001 47/62 R |
| 2015/0264871 A1 | * | 9/2015 | Finnerty | A01G 9/18 47/62 A |
| 2016/0192607 A1 | * | 7/2016 | Kitagawa | A01G 31/02 47/62 E |

* cited by examiner

ECOLOGICAL HYDROPONICS CONTROL SYSTEM

FIELD OF THE INVENTION

The present invention relates to hydroponics field, and more particularly to an ecological hydroponics control system.

BACKGROUND OF THE INVENTION

Hydroponic plant is the crop cultivated by water nutrient solution instead of soil, this manner can furthest meet the requirements of the plant root system to such as water, fertilizer, air and so on, making full use of the maximum potential about the crop growth. Due to the high production and good quality of the hydroponic crop, the current crop planting in hydroponic manner is being developed to the crop cultivation system with scientization, modernization, automation and so on step by step. Accordingly, the device adapt to plant the hydroponic plants on a large scale is required, and this device is required to have a certain automation function, thus reducing the manpower and material resources.

The traditional ecological hydroponics system has single and imperfect function, and can not control the whole ecological system in place, and it is difficult to adjust the ecological environment and the stability and productivity is low.

OBJECTS AND SUMMARY OF THE INVENTION

In order to overcome the foregoing disadvantages existed in the prior art, the purpose of the present invention is to provide an ecological hydroponics control system with high productivity and stability and capable of controlling the various ecological environments intelligently.

The technical solution adopted to solve the technical problem by the present invention is as follows: an ecological hydroponics control system includes an ecological hydroponics house, wherein: the ecological hydroponics house is provided with ecological control system, smart host system, sensing system and planting system, the smart host system is connected to the ecological control system, the sensing system and the planting system, the ecological control system includes:

water supplying and draining system, the planting system can be provided with water through water tank and water pump, the water tank is disposed outside the ecological hydroponics house, water level of the water tank can be detected by using the water level sensor of the sensing system, and the smart host system can drive the water pump according to the feedback signal of sensing system, realizing functions of water supplying and water recovering, the water tank is also provided with master water draining switch for draining water or sewage;

lighting system, which includes several LEDs and lift assembly for mounting the LEDs, the lift assembly is disposed at the top of the ecological hydroponics house, and the LEDs are arranged in an array configuration and has an interval of 0.5 m-1.5 m between each other; the light energy is detected by using light sensing sensor of the sensing system, the smart host system can drive the lighting system according to the feedback signal of the sensing system, to enhance or weaken the lighting intensity of LED to improve the utilization of light energy, simultaneously, the lighting system can be moved up and down in the ecological hydroponics house by using the lift assembly, so as to increase or reduce the distance between plant and light source, to obtain the best lighting environment for the plant growth. The light of LED can be adjusted automatically, the RGB wireless dimming application design is employed, the corresponding light color and light are set according to the light required by the plant, to meet the requirements for the plant growth.

air conditioning system, the temperature of the ecological hydroponics house can be detected by using temperature sensor of the sensing system, and the smart host system can drive air conditioner according to the feedback signal of sensing system, realizing the function of controlling the temperature;

humidifying system, which includes humidifier and air conditioner, the humidity of the ecological hydroponics house can be detected by using humidity sensor of the sensing system, and the smart host system can drive the humidifier to humidify the environment or drive the air conditioner to dehumidify according to the feedback signal of the sensing system;

The temperature sensor and humidity sensor acquire the data of temperature and humidity in real time, and the data are fed back to smart host system through the sensing system, the air conditioner is thermostatic and humidistat air conditioner and uses RS-485 communication line to obtain the instruction from smart host system, to adjust the temperature and humidity in the ecological hydroponics house automatically.

Ventilating system, which includes suction fan and check valve at the top of the ecological hydroponics house, and the smart host system can drive ventilator according to the feedback signal of oxygen sensor of the sensing system, and the oxygen passes through check valve, ecological hydroponics house and suction fan in turn, realizing the ventilation function; the oxygen sensor provides the oxygen environmental index in the ecological hydroponics house, and whether the ventilator is activated or the check valve is opened or not depends on the setting values of the smart host system, and the check valve prevents the gas flow from running off outward.

Gas supplying system, which includes carbon dioxide generator and fixing structure device which are mounted outside the ecological hydroponics house, carbon dioxide concentration can be detected by carbon dioxide sensor of the sensing system, the smart host system can drive the carbon dioxide generator according to the feedback signal of the sensing system, realizing the function of gas supplying. The carbon dioxide sensor can acquire the carbon dioxide concentration in the ecological hydroponics house in real time, the smart host system automatically recognizes the carbon dioxide environmental condition according to the setting values, to determine whether activating the carbon dioxide generator to supply the gas or not.

As a further improvement to the present invention: the lift assembly of lighting system is provided with manual light lift handle and lift driving motor, the manual light lift handle is disposed outside of the ecological hydroponics house, and the lift driving motor is connected to the smart host system.

As a further improvement to the present invention: the planting system includes several cultivating water buckets distributed in a regular array and water tube assembly, the water tube assembly is composed of water tube, right-angle tube, three way tube and joint, and is distributed at the bottom of the ecological hydroponics house, the cultivating water buckets are disposed on one side of the water tube assembly, and water supplying hole is disposed at one side of the bottom of the cultivating water bucket, each of the cultivating water buckets is connected to the water tube assembly through the water supplying hole, and water valve switch is provided at the joint, the water tube assembly is connected to the water supplying and draining system.

As a further improvement to the present invention: the sensing system includes water level sensor, light sensing sensor, temperature sensor, humidity sensor, oxygen sensor and carbon dioxide sensor, and these sensors are all disposed inside the ecological hydroponics house.

As a further improvement to the present invention: Waterproof cloth is disposed at the bottom of the outer side of the ecological hydroponics house, and the waterproof cloth is arranged around the bottom of the ecological hydroponics house through one turn.

As a further improvement to the present invention: the smart host system includes control host, and the control host is composed of system core board, main interface board, power source board, electric power control board, power source interface board and attachment unit, and this control host is the central unit of the smart host system;

system core board: system core, DDR3 1G Byte, EMMC/NAND FLASH compatibility;

main interface board: it is carrier of the core board and drives the interface between circuit, wireless communication module, interface portion circuit and the control board;

power source board: providing electric power of 12V and 2 A to host portion, electric power control board: controlling the electrical power output of each portion of the system, and receiving instructions from host to achieve process controlling, power source interface board: mainly the input interface of the external alternating current.

As a further improvement to the present invention: the ecological hydroponics house is composed of several splice units, beam column units and angle chain units. The splice units have regular shape, such as square, diamond and so on, to splice and compose a integral plane, after the splice units have composed to be a plane, the ecological hydroponics house can be formed by several planes enclosed together through beam column structure and angle chain unit, as the ecological hydroponics house is composed of several splice units, its dimension can be increased or reduced according to the specific geographical condition and actual requirement, it has good extensibility, simultaneously, the splice units can be readily transported, removed and reinserted easily, and its shape can be varied.

As compared with the prior art, the present invention has the following advantageous effects:

the present invention has characteristics of high productivity and high stability, also has ability of controlling various ecological environments including main environments of plant growing: temperature, humidity, light, oxygen, carbon dioxide, water, nutrition and so on, providing ecological environment suitable for the plant growing best, the cultivation period can be shortened to $\frac{1}{2}$-$\frac{2}{3}$ of the conventional cultivation period, it also has water saving function, where the water volume required will be about $\frac{1}{50}$ of that required in the normal open-type plant culture, which obtaining the maximized productivity and resource utilization. Simultaneously, as the cultivated plant is grew in the optimum growing environment, producing the products with high quality and cultivating the seed easily, and the plant with high additional value can be produced, the transporting and packaging resource can be saved, and it can be produced in situ.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION OF EMBODIMENTS

Figure 1:
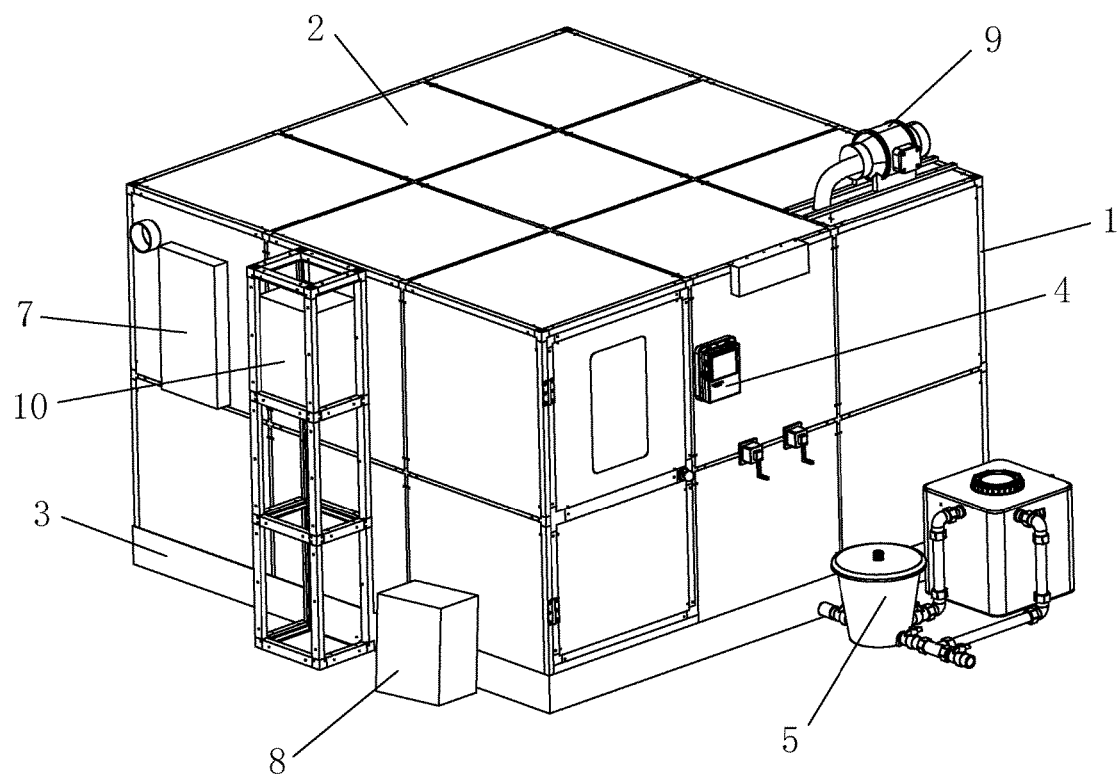
FIG. 1 is the schematic diagram of the structure of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 2:
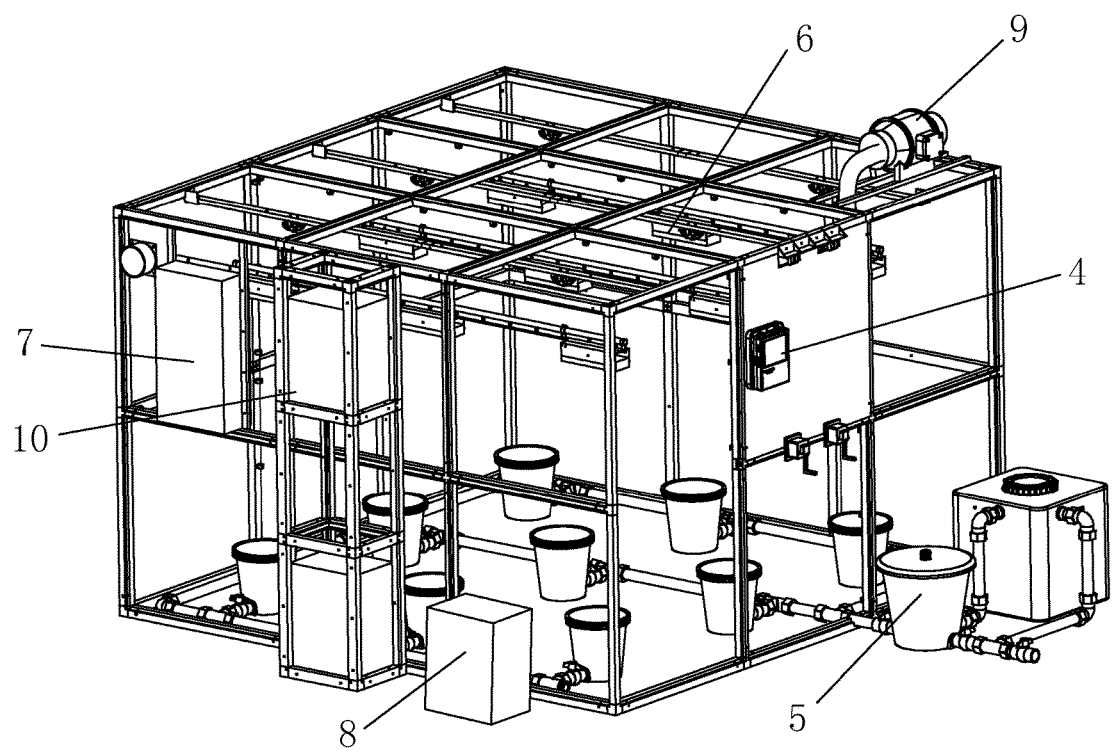
FIG. 2 is the schematic diagram of the structure of the present invention.
Figure 3:
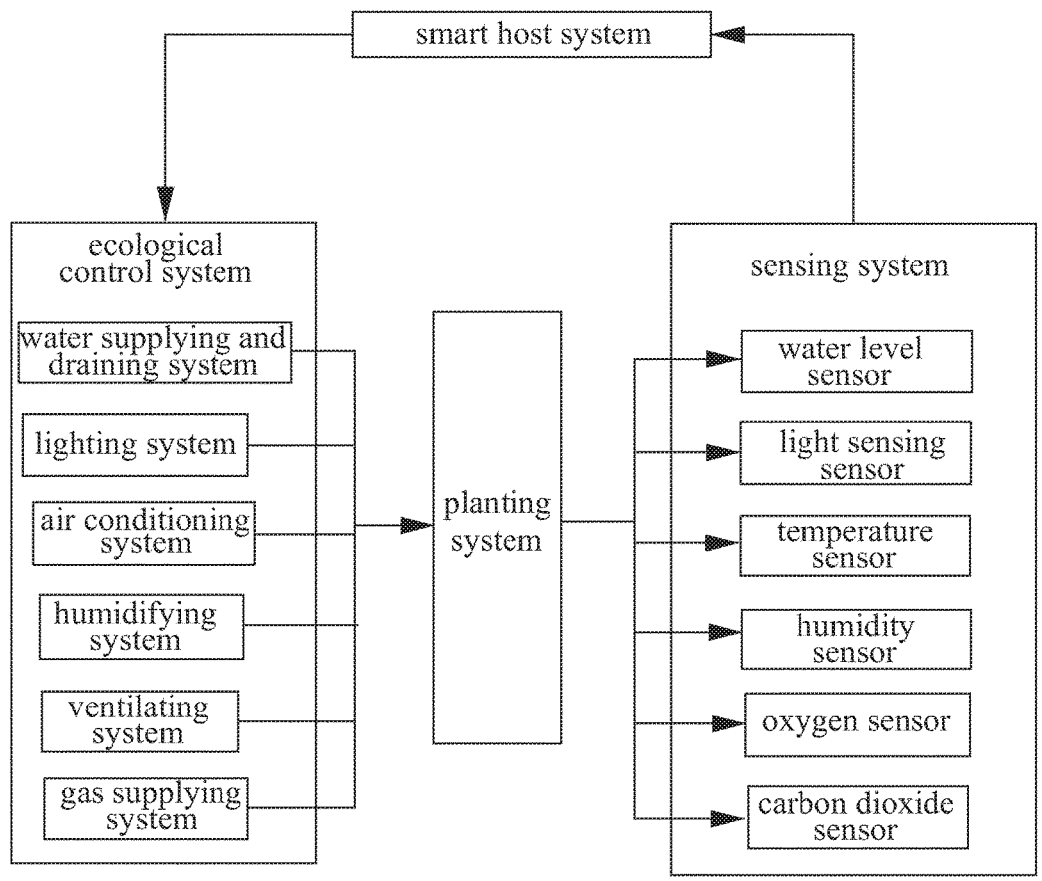
FIG. 3 is the schematic diagram of the structure of the present invention.

Now the present invention is further described in conjunction with the accompanying drawings and embodiments:

Referring to FIG. 1 to FIG. 3, an ecological hydroponics control system includes an ecological hydroponics house, the ecological hydroponics house is provided with an ecological control system, a smart host system, a sensing system and a planting system, the smart host system is connected to the ecological control system, the sensing system and the planting system, and the ecological hydroponics house is formed by employing aluminum profile 1 to construct the framework and plastic-steel profile 2 to cover the framework, and the internal portion of the ecological hydroponics house is enclosed, opaque and heat-insulating, and will not be affected by the external environment. The ecological hydroponics house is spliced by using aluminium profile unit, and angle chain and beam column, which has greater advantage about extensibility. Waterproof cloth 3 is disposed at the bottom of the outer side of the ecological hydroponics house, and the waterproof cloth 3 is arranged around the bottom of the ecological hydroponics house through one turn, obtaining good gas tightness. The smart host system 4 is disposed at one side of the door of the ecological hydroponics house.

The ecological control system includes:

water supplying and draining system 5, the planting system can be provided with water through water tank and water pump, the water tank is disposed outside the ecological hydroponics house, water level of the water tank can be detected by using the water level sensor of the sensing system, and the smart host system can drive the water pump according to the feedback signal of the sensing system, realizing functions of water supplying and water recovering; the water tank is also provided with master water draining switch for draining water or sewage;

lighting system 6, which includes several LEDs and lift assembly for mounting the LEDs, the lift assembly is disposed at the top of the ecological hydroponics house, and the LEDs are arranged in an array configuration and has an interval of 0.5 m-1.5 m between each other; the light energy is detected by using light sensing sensor of the sensing system, the smart host system can drive the lighting system according to the feedback signal of the sensing system, to enhance or weaken the lighting intensity of LED to improve the utilization of light energy, simultaneously, the lighting system can be moved up and down in the ecological hydroponics house by using the lift assembly, so as to increase or reduce the distance between plant and light source, to obtain the best lighting environment for the plant growth. The light of LED can be adjusted automatically, the RGB wireless dimming application design is employed, the corresponding light color and light are set according to the light required by the plant, to meet the requirements for the plant growth.

air conditioning system 7, the temperature of the ecological hydroponics house can be detected by using temperature sensor of the sensing system, and the smart host system can drive air conditioner according to the feedback signal of the sensing system, realizing the function of controlling the temperature;

humidifying system 8, which includes humidifier and air conditioner, the humidity of the ecological hydroponics house can be detected by using humidity sensor of the sensing system, and the smart host system can drive the humidifier to humidify the environment or drive the air conditioner to dehumidify according to the feedback signal of the sensing system;

the temperature sensor and humidity sensor acquire the data of temperature and humidity in real time, and the data are fed back to the smart host system through the sensing system, the air conditioner is thermostatic and humidistat air conditioner and uses RS-485 communication line to obtain the instruction from the smart host system, to adjust the temperature and humidity in the ecological hydroponics house automatically.

Ventilating system 9, which includes suction fan and check valve at the top of the ecological hydroponics house, and the smart host system can drive ventilator according to the feedback signal of oxygen sensor of the sensing system, and the oxygen passes through the check valve, the ecological hydroponics house and the suction fan in turn, realizing ventilation function; the oxygen sensor provides the oxygen environmental index in the ecological hydroponics house, and whether the ventilator is activated or the check valve is opened or not depends on the setting values of the smart host system, and the check valve prevents the gas flow from running off outward.

Gas supplying system 10, which includes carbon dioxide generator and fixing structure device which are mounted outside the ecological hydroponics house, carbon dioxide concentration can be detected by carbon dioxide sensor of the sensing system, the smart host system can drive the carbon dioxide generator according to the feedback signal of the sensing system, realizing the function of gas supplying. The carbon dioxide sensor can acquire the carbon dioxide concentration in the ecological hydroponics house in real time, the smart host system automatically recognizes the carbon dioxide environmental condition according to the setting values, to determine whether activating the carbon dioxide generator to supply the gas or not.

The lift assembly of the lighting system is provided with manual light lift handle and lift driving motor, the manual light lift handle is disposed outside of the ecological hydroponics house, and the lift driving motor is connected to the smart host system.

The planting system includes several cultivating water buckets distributed in a regular array and water tube assembly, the water tube assembly is composed of water tube, right-angle tube, three way tube and joint, and is distributed at the bottom of the ecological hydroponics house, the cultivating water buckets are disposed on one side of the water tube assembly, and water supplying hole is disposed at one side of the bottom of the cultivating water bucket, each of the cultivating water buckets is connected to the water tube assembly through the water supplying hole, and water valve switch is provided at the joint, the water tube assembly is connected to the water supplying and draining system.

The sensing system includes water level sensor, light sensing sensor, temperature sensor, humidity sensor, oxygen sensor and carbon dioxide sensor, and these sensors are all disposed inside the ecological hydroponics house.

The smart host system includes control host, and the control host is composed of system core board, main interface board, power source board, electric power control board, power source interface board and attachment unit, and this control host is the central unit of the smart host system;

system core board: system core, DDR3 1G Byte, EMMC/NAND FLASH compatibility, main interface board: it is carrier of the core board and drives the interface between circuit, wireless communication module, interface portion circuit and the control board, power source board: providing electric power of 12V and 2 A to host portion, electric power control board: controlling the electrical power output of each portion of the system, and receiving instructions from host to achieve process controlling, power source interface board: mainly the input interface of the external alternating current.

Smart host system is used for the smart control and status management of the ecological hydroponics control system, mainboard and core board of the host is used to provide smart control management center, which is built by using the android platform with four-core CPU, and the external information acquisition and data exchanging is achieved through RS232 serial port, the environment data acquired by the sensing system is fed back to smart host system through RS232 communication, also, the smart host system transmits instructions to the corresponding system through RS232 communication, carbon dioxide sensor, oxygen sensor, temperature sensor, humidity sensor and so on all acquire the environment data index in real time, and the environment data index are transmitted to the smart host system for judgement in real time, when the range exceeds above or below the required value, the smart host system will make intelligent decision, and control the relay switch of the electric power board, to activate or deactivate the corresponding system. The electric power control board has 8 power outputs including air conditioning switch, humidifying switch, water supplying switch, water draining switch, gas supplying switch, lighting switch, ventilating switch and gas changing switch, the smart host system can control the activation or deactivation of each system according to the initial setting condition or operation mode set by user, and the whole process can be controlled automatically, and the conditional constraint about the control comes from sensing system and user setting condition.

From the foregoing description, the other various corresponding variant solutions made by those skilled in the art after reading the present invention, according to the technical solution and technical idea of the present invention without inventive mental labor, are within the scope of the present invention.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. Ecological hydroponics control system, including ecological hydroponics house, characterized in that: the ecological hydroponics house is provided with ecological control system, smart host system, sensing system and planting system, the smart host system is connected to the ecological control system, the sensing system and the planting system, the ecological control system includes:

water supplying and draining system, the planting system can be provided with water through water tank and water pump, the water tank is disposed outside the ecological hydroponics house, water level of the water tank can be detected by using a water level sensor of the sensing system, and the smart host system can drive the water pump according to the feedback signal of the sensing system, realizing functions of water supplying and water recovering, the water tank is also provided with master water draining switch for draining water or sewage, lighting system, which includes several LEDs and lift assembly for mounting the LEDs, the lift assembly is disposed at the top of the ecological hydroponics house, and the LEDs are arranged in an array configuration and has an interval of 0.5 m-1.5 m between each other;

air conditioning system, the temperature of the ecological hydroponics house can be detected by using temperature sensor of the sensing system, and the smart host system can drive air conditioner according to the feedback signal of the sensing system, realizing the function of controlling the temperature;

ventilating system, which includes suction fan and check valve at the top of the ecological hydroponics house, and the smart host system can drive ventilator according to the feedback signal of oxygen sensor of the sensing system, and the oxygen passes through the check valve, the ecological hydroponics house and the suction fan in turn, realizing the ventilation function;

humidifying system, which includes humidifier and air conditioner, the humidity of the ecological hydroponics house can be detected by using humidity sensor of the sensing system, and the smart host system can drive the humidifier to humidify the environment or drive the air conditioner to dehumidify according to the feedback signal of the sensing system, gas supplying system, which includes carbon dioxide generator and fixing structure device which are mounted outside the ecological hydroponics house, carbon dioxide concentration can be detected by carbon dioxide sensor of the sensing system, the smart host system can drive the carbon dioxide generator according to the feedback signal of the sensing system, realizing the function of gas supplying.

2. According to the ecological hydroponics control system set forth in claim 1, characterized in that: the lift assembly of the lighting system is provided with manual light lift handle and lift driving motor, the manual light lift handle is disposed outside of the ecological hydroponics house, and the lift driving motor is connected to the smart host system.

3. According to the ecological hydroponics control system set forth in claim 1, characterized in that: the planting system includes several cultivating water buckets distributed in a regular array and water tube assembly, the water tube assembly is composed of water tube, right-angle tube, three way tube and joint, and is distributed at the bottom of the ecological hydroponics house, the cultivating water buckets are disposed on one side of the water tube assembly, and water supplying hole is disposed at one side of the bottom of the cultivating water bucket, each of the cultivating water buckets is connected to the water tube assembly through the water supplying hole, and water valve switch is provided at the joint, the water tube assembly is connected to the water supplying and draining system.

4. According to the ecological hydroponics control system set forth in claim 1, characterized in that: the sensing system includes water level sensor, light sensing sensor, temperature sensor, humidity sensor, oxygen sensor and carbon dioxide sensor, and these sensors are all disposed inside the ecological hydroponics house.

5. According to the ecological hydroponics control system set forth in claim 1, characterized in that: the ecological hydroponics house is composed of several splice units, beam column units and angle chain units.

* * * * *